(12) United States Patent  (10) Patent No.: US 8,240,053 B1
Johnson  (45) Date of Patent: Aug. 14, 2012

(54) RAMP ASSEMBLY INSTALLATION METHOD

(75) Inventor: David Johnson, Modesto, CA (US)

(73) Assignee: Lift-U, division of Hogan Mfg., Inc., Escalon, CA (US)

( * ) Notice: Subject to any disclaimer, the term of this patent is extended or adjusted under 35 U.S.C. 154(b) by 0 days.

(21) Appl. No.: 13/441,755

(22) Filed: Apr. 6, 2012

Related U.S. Application Data

(62) Division of application No. 12/575,172, filed on Oct. 7, 2009, now Pat. No. 8,215,020.

(51) Int. Cl.
*B21D 53/88* (2006.01)
(52) U.S. Cl. ....................................... 29/897.2
(58) Field of Classification Search ............ 29/428, 29/469, 897.2; 424/537, 549; 14/71.3
See application file for complete search history.

(56) References Cited

U.S. PATENT DOCUMENTS

| | | | |
|---|---|---|---|
| 6,602,041 B2 * | 8/2003 | Lewis et al. | 414/537 |
| 6,843,635 B2 * | 1/2005 | Cohn | 414/549 |
| 7,533,432 B2 * | 5/2009 | Morris et al. | 14/71.3 |
| 7,533,434 B2 * | 5/2009 | Morris et al. | 14/71.3 |
| 7,681,272 B2 * | 3/2010 | Morris et al. | 14/71.3 |
| 7,870,631 B2 * | 1/2011 | Morris et al. | 14/71.3 |

* cited by examiner

*Primary Examiner* — John C Hong
(74) *Attorney, Agent, or Firm* — Christensen O'Connor Johnson Kindness PLLC

(57) ABSTRACT

Exemplary methods are provided for installing a ramp assembly into a vehicle. The vehicle includes a floor, a vehicle well disposed in the floor, an inboard and outboard ramp support members. In one embodiment, ramp assembly mounts, such as mounting blocks, are utilized for installing the ramp assembly into the vehicle.

4 Claims, 16 Drawing Sheets

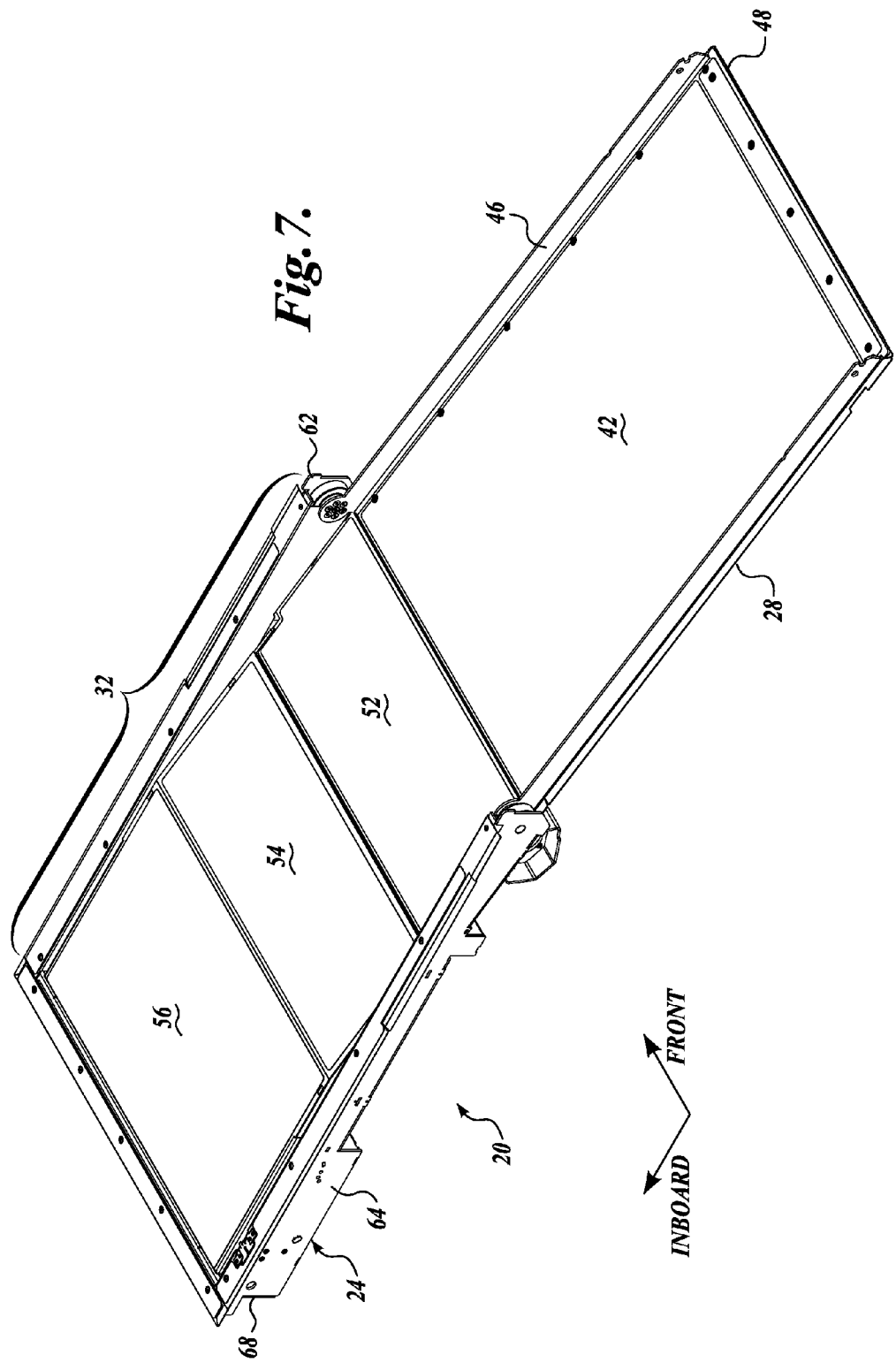

_US 8,240,053 B1_

RAMP ASSEMBLY INSTALLATION METHOD

CROSS-REFERENCE TO RELATED APPLICATION

The present application is a division of U.S. application Ser. No. 12/575,172, filed Oct. 7, 2009, the disclosure of which is expressly incorporated by reference.

BACKGROUND

The Americans with Disabilities Act (ADA) requires the removal of physical obstacles to those who are physically challenged. The stated objective of this legislation has increased public awareness and concern over the requirements of the physically challenged. Consequentially, there has been more emphasis in providing systems that assist such a person to access a vehicle, such as a bus, van, or train.

A common manner of providing the physically challenged with access to vehicles is a ramp. Various ramp operating systems for vehicles are known in the art. Some ramps slide out from underneath the floor of the vehicle and tilt down. Others, known as foldout ramps, stow horizontally within a recess in the vehicle floor and pivot upward and outward to a downward-sloping position. Further, others are stowed in a vertical position and are pivoted about a hinge, while still others are supported by boom and cable assemblies.

Fold out ramps on vehicles confront a variety of technical problems. Longer ramps are desirable because the resulting slope is more gradual and more accessible by wheelchair-bound passengers. Longer ramps are, however, heavier and require more torque about the pivot axis to be reciprocated between deployed and stowed positions. Also, the ramp length is typically limited by the space available in the vehicle. Further, as briefly described above, fold out ramps require a recess or well in the vehicle's vestibule floor in which to store the retracted/stowed ramp. The recess or well, as well as the location of the vehicle chassis can present installation challenges that can result in ramp operability problems.

SUMMARY

In accordance with aspects of the present disclosure, a method is provided for installing a ramp assembly into a vehicle. The vehicle includes a floor, a vehicle well disposed in the floor, and inboard and outboard ramp support members. The method comprises moving the ramp assembly with respect to the vehicle well, wherein the ramp assembly is disposed in the stowed position with a top surface facing upwardly away from the vehicle floor, affixing mounts to the inboard ramp support as the inboard portion of the ramp assembly is supported in place, wherein the mounts are capable of supporting the inboard end of the ramp assembly and maintaining a vertical position of the ramp assembly while permitting horizontal movement of the ramp assembly within the vehicle well once affixed thereto; adjusting the position of the ramp assembly so that the top surface of the ramp assembly is substantially flush with the vehicle floor, and securing the outboard end of the ramp assembly to the outboard ramp support member.

In accordance with another aspect of the present disclosure, a method is provided for installing a ramp assembly into a vehicle. The vehicle includes a floor, a vehicle well disposed in the floor, and inboard and outboard ramp support members. The method comprises affixing one or more mounts to the inboard ramp support member; thereafter, moving the ramp assembly with respect to the vehicle well such that the outboard end of the ramp assembly is supported by the outboard cross member and the inboard end of the ramp assembly is supported by the one or more mounts so as to maintain a vertical position of the ramp assembly, wherein the ramp assembly is disposed in the stowed position with a top surface facing upwardly away from the vehicle floor, adjusting the position of the ramp assembly so that the top surface of the ramp assembly is substantially flush with the vehicle floor, and securing the outboard end of the ramp assembly to the outboard ramp support member.

In accordance with another aspect of the present disclosure, a method is provided for installing a ramp assembly into a vehicle. The vehicle includes a floor, a vehicle well disposed in the floor, and inboard and outboard ramp support members. The method comprises moving the ramp assembly with respect to the vehicle well such that the top surface of the ramp assembly is substantially flush with the vehicle floor, wherein the ramp assembly is disposed in the stowed position with a top surface facing upwardly away from the vehicle floor, affixing mounts to the inboard ramp support as the inboard portion of the ramp assembly is supported in place, the mounts capable of supporting the inboard end of the ramp assembly and maintaining a vertical position of the ramp assembly while permitting horizontal movement of the ramp assembly within the vehicle well once affixed thereto, and securing the outboard end of the ramp assembly to the outboard ramp support member.

This summary is provided to introduce a selection of concepts in a simplified form that are further described below in the Detailed Description. This summary is not intended to identify key features of the claimed subject matter, nor is it intended to be used as an aid in determining the scope of the claimed subject matter.

DESCRIPTION OF THE DRAWINGS

The foregoing aspects and many of the attendant advantages of this invention will become more readily appreciated by reference to the following detailed description, when taken in conjunction with the accompanying drawings, wherein:

FIG. 7 is a top perspective view of the ramp assembly of FIG. 3 shown in a deployed position;

DETAILED DESCRIPTION

The detailed description set forth below in connection with the appended drawings where like numerals reference like elements is intended as a description of various embodiments of the disclosed subject matter and is not intended to represent the only embodiments. Each embodiment described in this disclosure is provided merely as an example or illustration and should not be construed as preferred or advantageous over other embodiments. The illustrative examples provided herein are not intended to be exhaustive or to limit the invention to the precise forms disclosed. Similarly, any steps described herein may be interchangeable with other steps, or combinations of steps, in order to achieve the same or substantially similar result.

The following discussion proceeds with reference to an example of one type of wheelchair ramp assembly that is suitable for use in vehicles having, for example, a vestibule floor. Such vehicles may include but are not limited to buses, vans, trains, etc. Then, exemplary methods of installing the ramp assembly into a vehicle, such as a bus, will be described. While the examples provided herein have been described with reference to their association with vehicles, it will be apparent to one skilled in the art that this is done for illustrative purposes only and should not be construed as limiting the scope of the invention, as claimed. Thus, it will be apparent to one skilled in the art that aspects of the present disclosure may be employed with other ramp assemblies and their installation in, for example, residential or commercial buildings, and the like. The following detailed description may use illustrative terms such as vertical, horizontal, front, rear, inboard, outboard, roadside, curbside, proximal, distal, etc. However, these terms are descriptive in nature and should not be construed as limiting. Further, it will be appreciated that embodiments of the present disclosure may employ any combination of features described herein.

Figure 1:
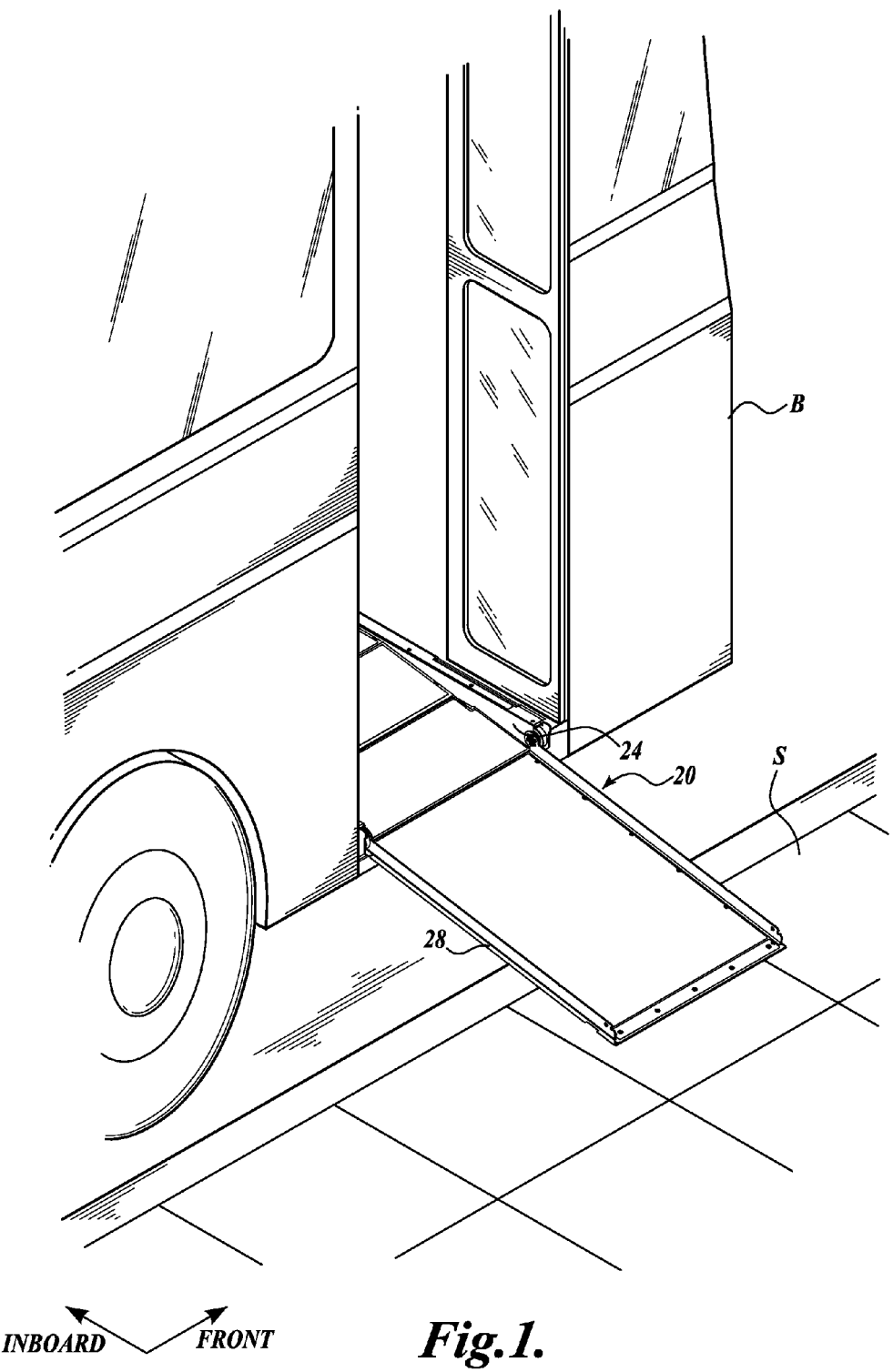
FIG. 1 is a partial perspective view of one exemplary vehicle, such as a bus, having a ramp assembly mounted therein.
Figure 2:
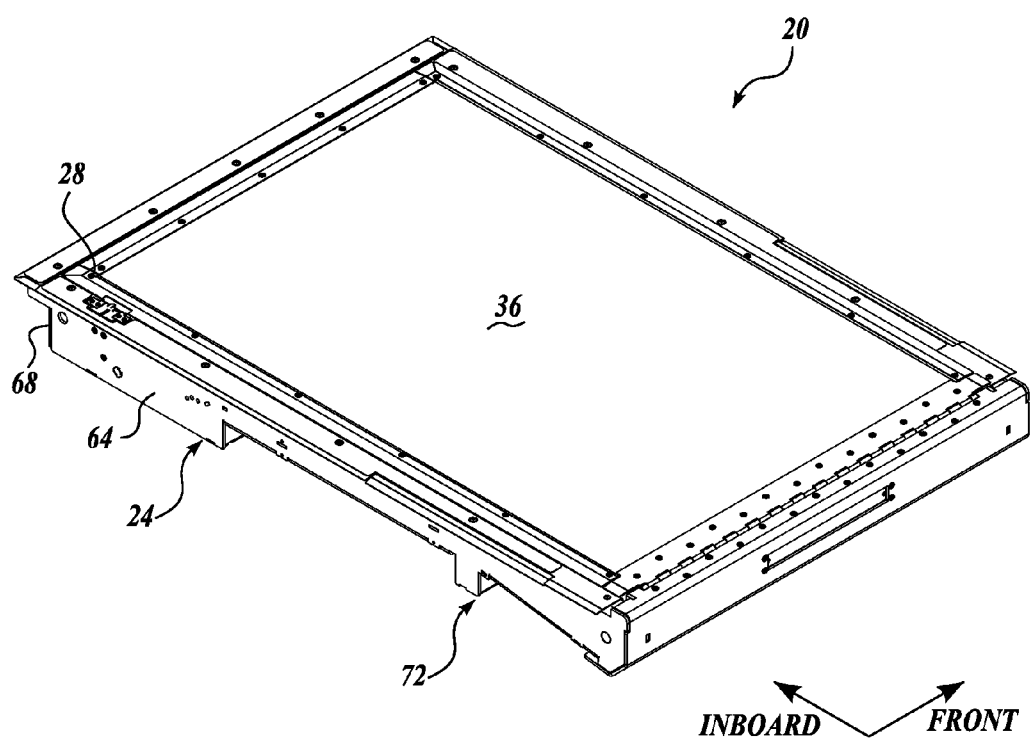
FIG. 2 is a top perspective view of one embodiment of a ramp assembly formed in accordance with aspects of the present disclosure, wherein the ramp assembly is in a stowed position.
Figure 3:
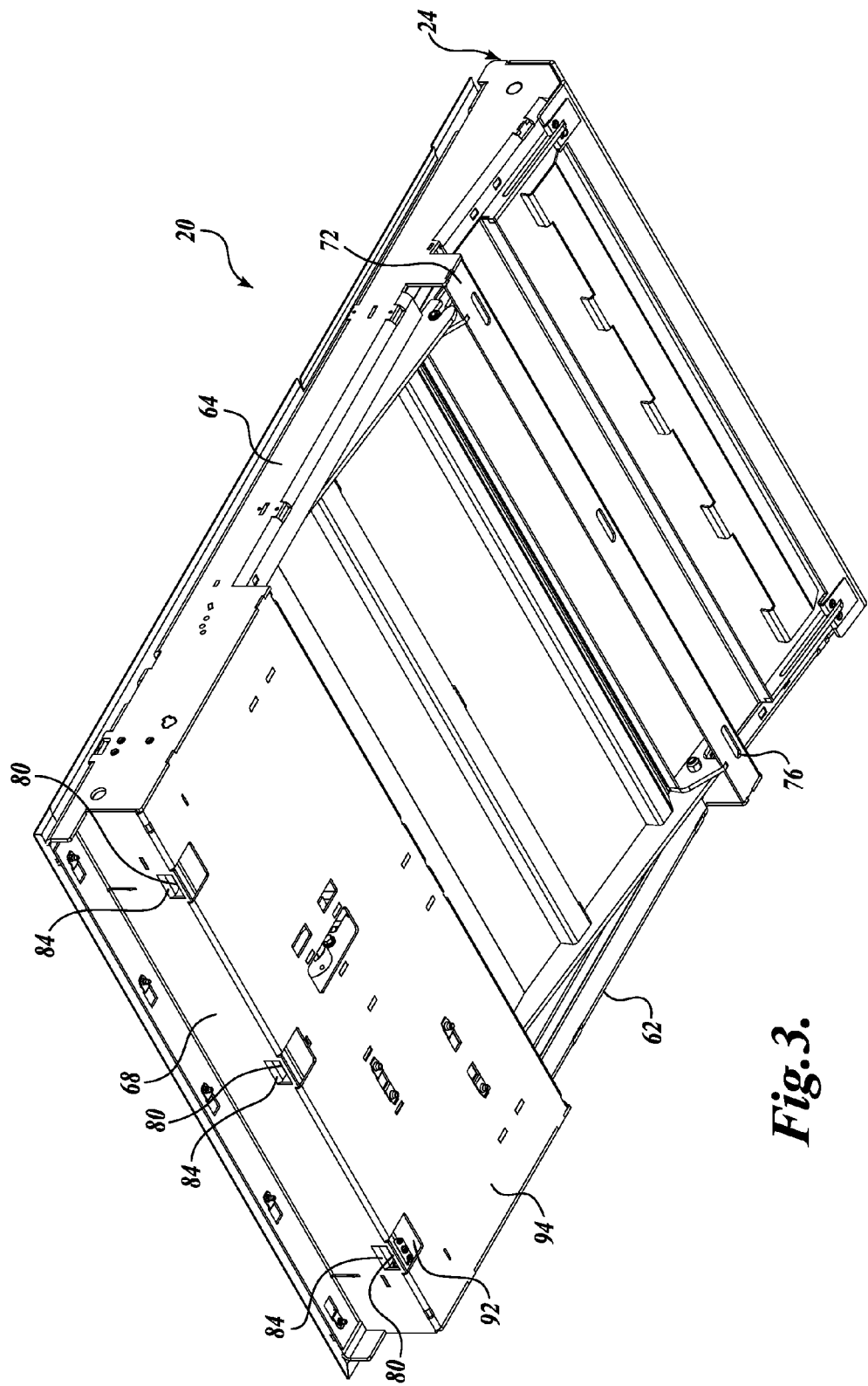
FIG. 3 is a bottom perspective view of the ramp assembly shown in FIG. 2.
Figure 4:
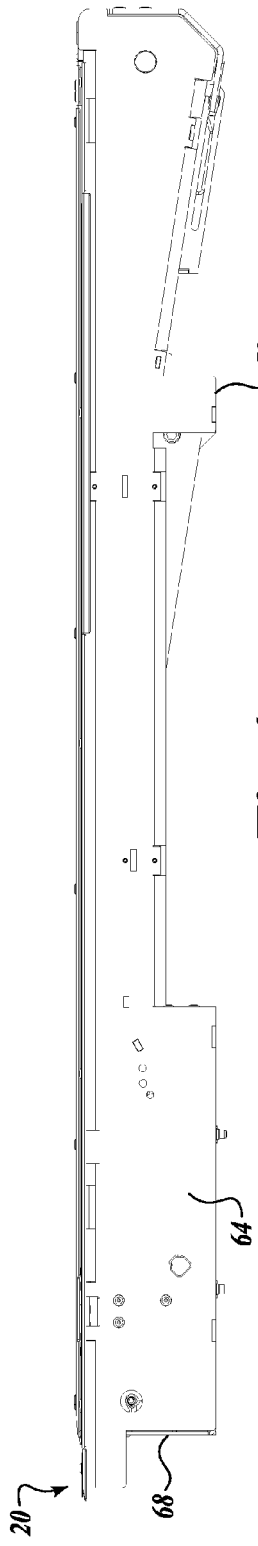
FIG. 4 is a rear side view of the ramp assembly shown in FIG. 2.
Figure 5:
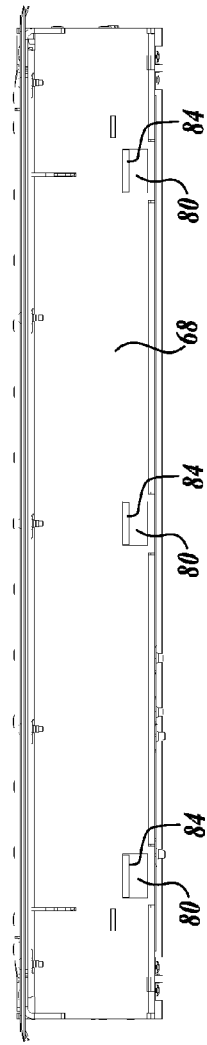
FIG. 5 is an inboard end view of the ramp assembly shown in FIG. 2.
Figure 6:
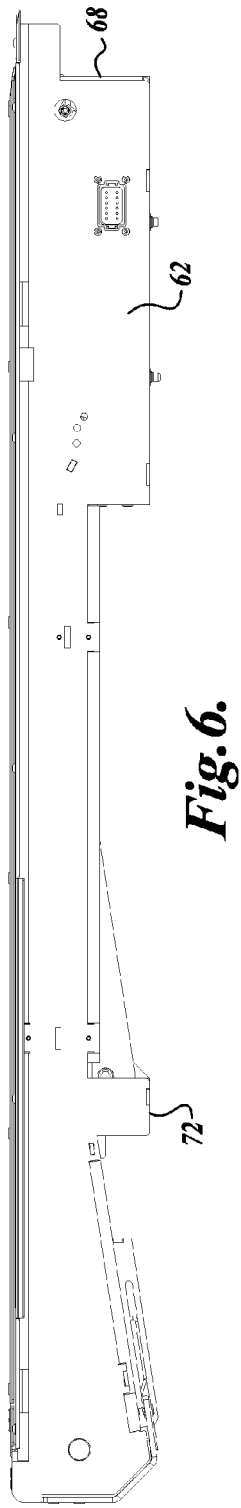
FIG. 6 is a front side view of the ramp assembly shown in FIG. 2.

FIG. 1 illustrates one exemplary embodiment of a fold-out type ramp assembly 20 (hereinafter "ramp assembly 20") installed in a vehicle, such as a bus B. As best shown in FIGS. 2, 3, and 7, the ramp assembly 20 includes a frame 24, an outboard ramp 28, and a moving floor 32 (see FIG. 7). As will be described in more detail below, the frame 24 of the ramp assembly 20 is adapted to be mounted into the floor of a vehicle, such as bus B, employing one or more novel installation methods. A drive assembly (not shown) operatively connected to the outboard ramp 28 is provided for conditionally reciprocating the outboard ramp 28 between the stowed position, shown in FIG. 2, and a deployed position, shown in FIG. 7. In the stowed position, the outboard ramp 28 and moving floor 32 (not shown in FIG. 2) are located such that the outboard ramp 28 is positioned over the moving floor 32, and the bottom surface 36 (also referred to as the "top surface" of the ramp assembly) of the outboard ramp 28 faces upward and is substantially coplanar, i.e., flush, with the floor (not shown) of the vehicle. In a deployed position, the outboard ramp 28 extends in an outboard and downward direction to contact a surface S (see FIG. 1), such as a curb or road side, thus providing a transition between the vehicle, such as bus B, and the surface S.

Referring now to FIG. 7, the outboard ramp 28 is pivotally connected to the frame 24 and hingedly coupled to the moving floor 32. The outboard ramp 28 includes a panel 42, which is constructed from well-known materials and side curbs 46 that extend upwardly from the front and rear sides of the panel 42. The side curbs 46 increases the strength of the outboard ramp 28 and provide edge guards for the sides of the outboard ramp 28, thereby increasing the overall safety of the ramp assembly 20. The outboard end of the outboard ramp 28 (when the ramp is in a deployed position) has a tapered nose portion 48 that provides a smooth transition between the panel 42 and the curb, sidewalk, etc., when the ramp assembly 20 is in a deployed position.

Still referring to FIG. 7, the moving floor 32 includes an outboard panel 52 hingedly coupled to an intermediate panel 54, and an inboard panel 56 hingedly coupled to the intermediate panel 54. The outboard end of the outboard panel 52, and thus the moving floor 32, is hingedly coupled to the inboard end (when the ramp is in a deployed position) of the outboard ramp 28. For brevity of the disclosure, and to not obscure various aspects of the present disclosure, the moving floor will not be described in more detail here. For one type of moving floor that may be practiced with the present disclosure, please see co-pending U.S. patent application Ser. No. 12/114,638, filed May 2, 2008, which is hereby incorporated by reference in its entirety.

It will be appreciated that the ramp assembly 20 includes other components, such as drive assembly, not shown in FIGS. 2-7 for ease of illustration. The drive assembly actuates the outboard ramp 28 to reciprocate between the stowed position and a deployed position. In that regard, the drive assembly may employ any known drive source, such as an electric motor(s) operatively coupled to an appropriate transmission, such as a drive chain/sprocket configuration, among others, for moving the outboard ramp 28 in a reciprocating manner. It will be appreciated that the drive assembly may use other transmissions, such as pulley/cable arrangements, rack/pinion arrangements, or belt drives, or combinations thereof in combination with an electric motor, or may use other drive sources, such as hydraulic or pneumatic linear or rotary actuators and associated components, such as fluid reservoirs, pumps, compressors, tanks, valves, etc. The drive assembly is conventionally connected to and controlled by a control system (not shown). Such components are generally known in the art, and therefore, will not be described in detail here.

In use, when a physically disabled passenger wishes to board or deboard a vehicle equipped with the ramp assembly 20, the ramp assembly 20 transitions from the stowed position shown in FIG. 2 wherein the outboard ramp 28 is disposed within the frame 24, to the deployed position shown in FIG. 7, wherein the outboard ramp 28 extends outwardly from the vehicle, in a downwardly sloping orientation. Once the passenger has boarded into or deboarded from the vehicle, the operator returns the outboard ramp 28 to its stowed position of FIG. 2.

To more fully understand and appreciate several features and aspects of the ramp installation methods described herein, several components of the ramp assembly 20 as well as the vehicle, such as bus B, will now be described in detail. Referring again to FIGS. 2-6, there are shown plan and perspective views of the ramp assembly in the stowed position. As best shown in FIGS. 2-6, the frame 24 includes at least front and rear (in relation to the front and rear of the vehicle in which the assembly is mounted) side walls 62 and 64, an end wall 68 interconnecting the side walls 62 and 64 at the inboard end of the ramp assembly 20, and a cross member 72 interconnecting the side walls 62 and 64 between approximately the mid-portion and the outboard end of the ramp assembly (hereinafter "outboard cross member 72" or "curbside cross member 72"). The sidewalls 62 and 64 and end wall 68 together define an open ended cavity for permitting the outboard ramp 28 to fold into and unfold out of the frame 24.

As best shown in FIG. 3, the outboard cross member 72 includes a number of elongated slots 76 for receiving fasteners, such as bolts, as will be discussed in more detail below. In the embodiment shown in FIGS. 3, 5, and 12, the end wall 68 includes a number of space apart oversized openings 80, which are sized and configured to loosely receive mounts, such as mounting blocks 82 shown in FIG. 12 when installing the ramp assembly 20 into the vehicle, such as bus B. As will be described in more detail below, the size of the mounting blocks 82 with respect to the openings 80 allow the mounting blocks 82 to laterally move a preselected distance, such as up to four (4) inches or more, therein.

The end wall 68 also includes an engagement surface 84 associated with each opening 80. In the embodiment shown in FIG. 12, the engagement surfaces 84 are defined by a number of horizontally disposed flanges 88 inwardly extending from the top of the openings 80 into the ramp assembly 20. Alternatively, the engagement surfaces 84 may be defined by a single flange or member integrally formed or secured to the end wall 68 and extending horizontally (i.e., parallel with the bottom surface 36 of the outboard ramp 28) along the end wall 68. It will be appreciated that other shapes and configurations for forming the engagement surface 84 may be practiced with embodiments of the present disclosure. For example, as best shown in FIG. 13, the end wall 68 may be configured to include a shoulder 90, the bottom surface of which forms the engagement surface 84. In use, the engagement surface(s) 84 are supported by the mounting blocks 82, which in turn, are mounted to the vehicle chassis or the like in order to define the vertical position of the inboard end of the ramp assembly 20 with respect to the vehicle floor.

Figure 12:
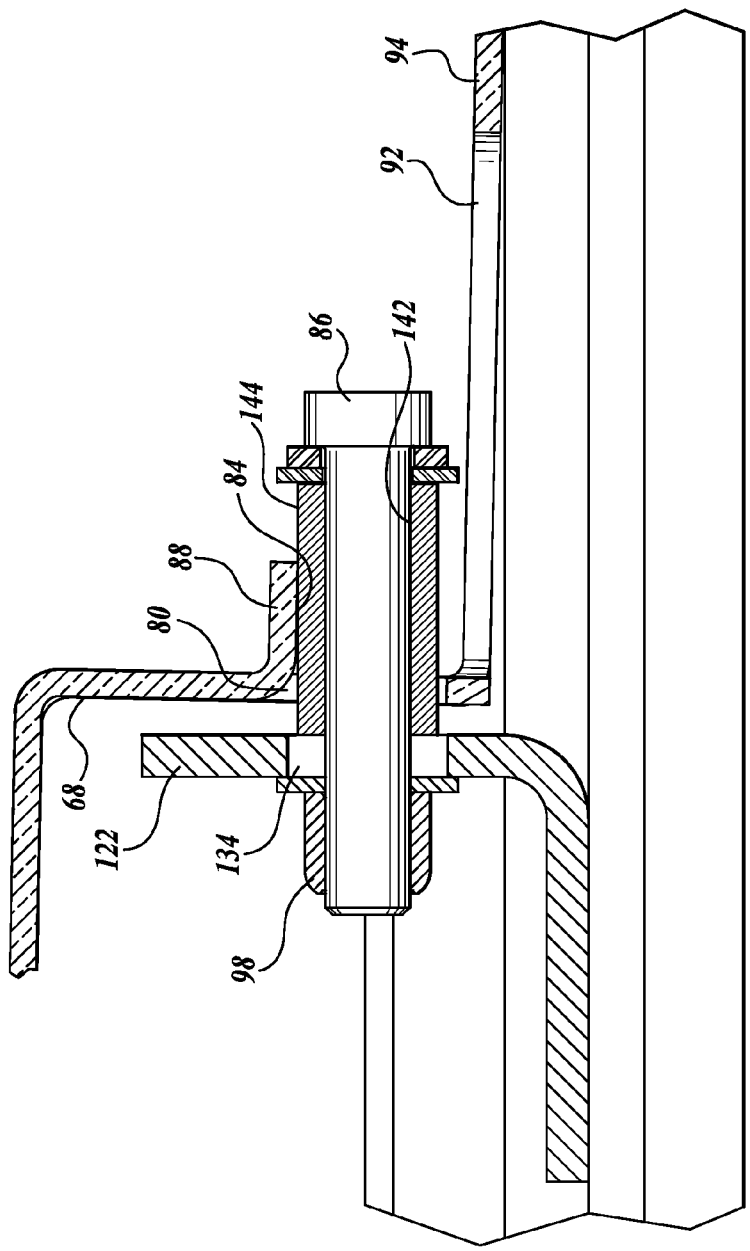
FIG. 12 is a partial cross sectional view of one embodiment of the inboard end of the ramp assembly supported by the mounting blocks.
Figure 13:
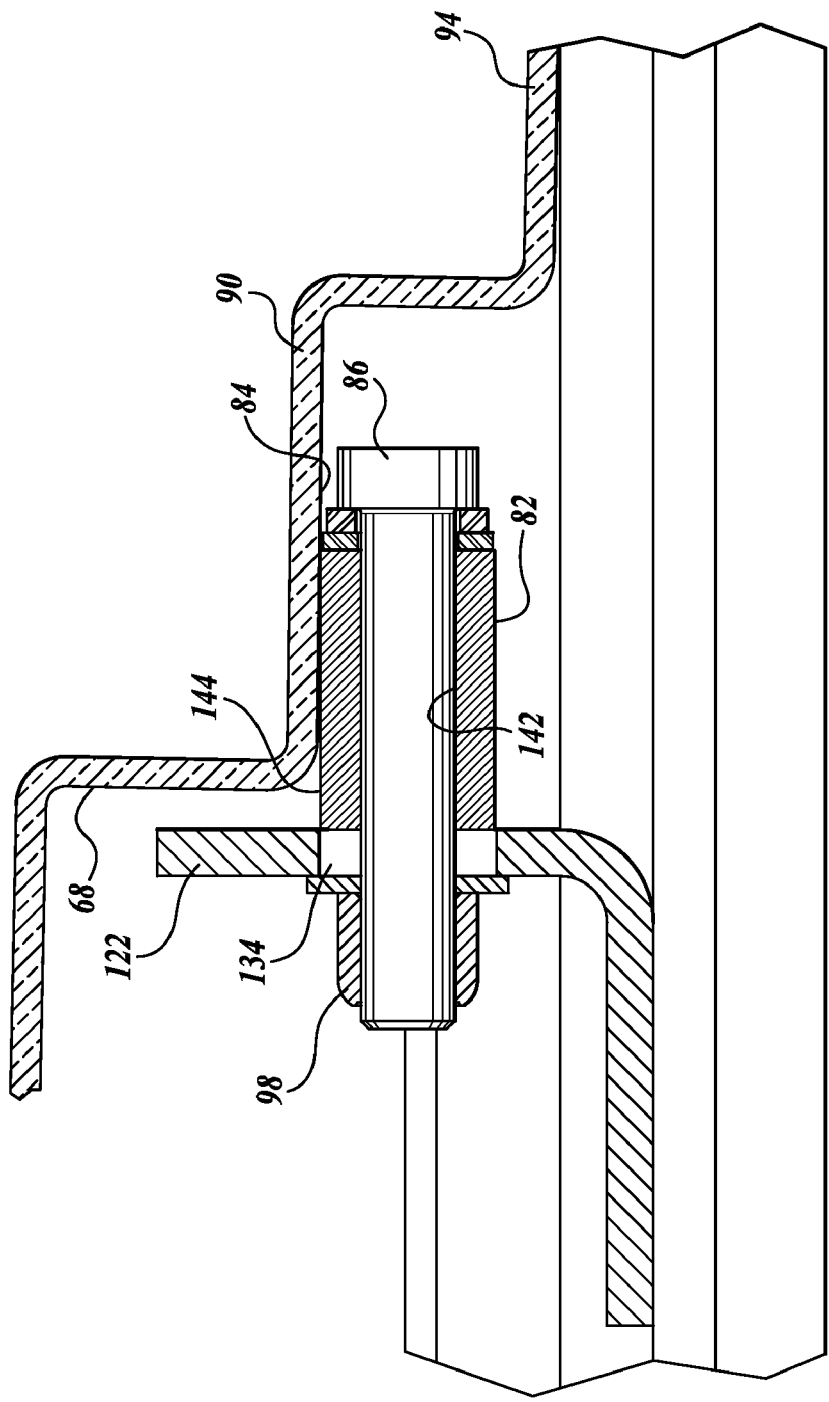
FIG. 13 is a partial cross sectional view of another embodiment of the inboard end of the ramp assembly supported by the mounting blocks.

In the embodiment shown in FIGS. 3 and 12, the frame 24 further includes a bottom plate 94 that spans between the side members 62 and 64 along the bottom of the ramp assembly 20 and adjacent the end wall 68. Openings 92 are provided in the bottom plate 94 so as to provide access to the openings 80 from below the ramp assembly 20. The openings 92 adjoin the inboard edge of the bottom plate 94 and are positioned so as to be in alignment with the openings 80 of the end wall 68. As best shown in FIG. 12, the openings 92 are sized and configured such that the mounting blocks 82 may be passed through the openings 92 from below the bottom plate 94, and a tool, such as a socket wrench or the like, can be inserted therein to tightened a fastener, such as bolt 86, which affixes the mounting blocks 82 to a vehicle chassis member 122 or the like.

Figure 9A:
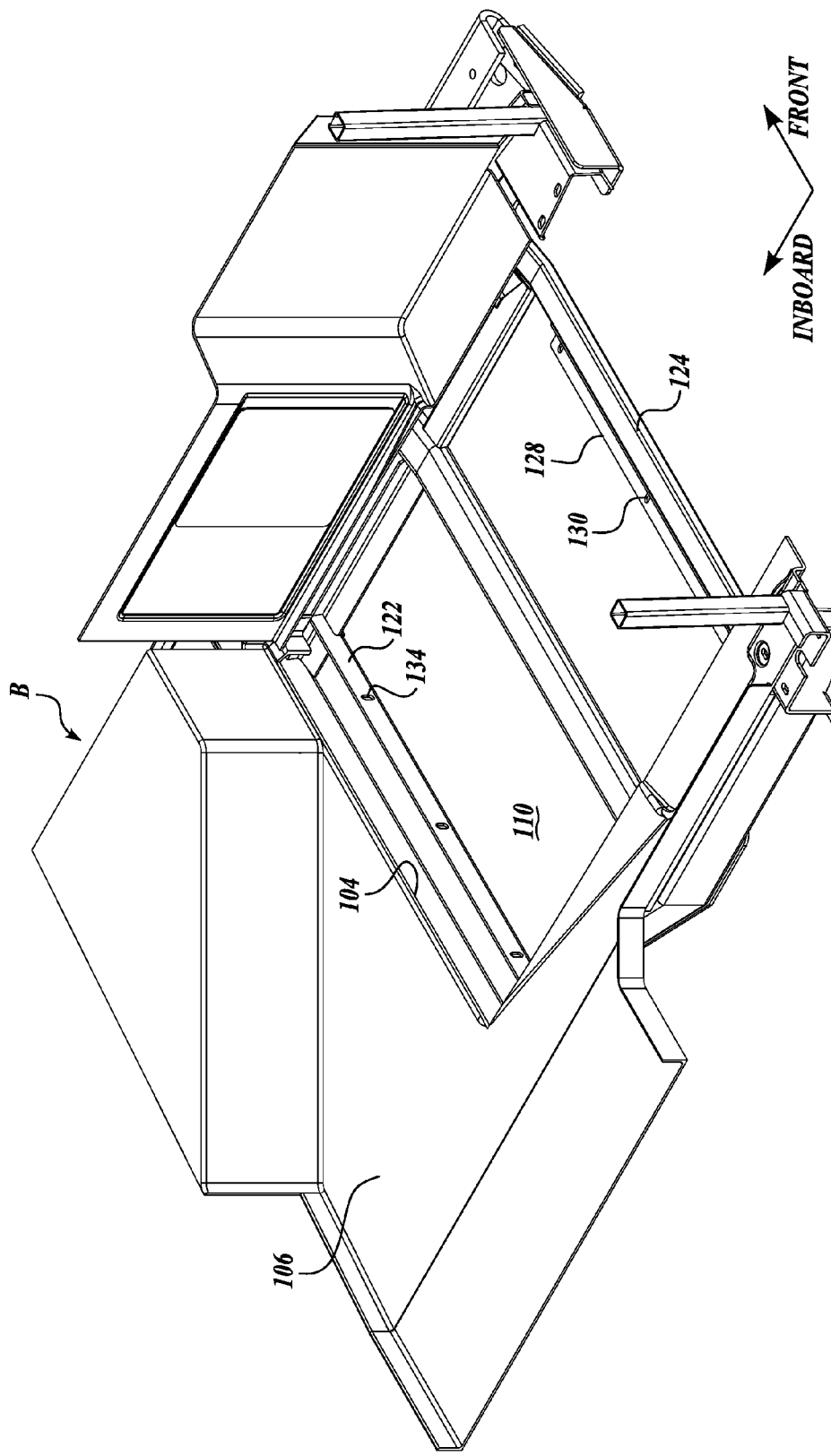
FIGS. 9A-9C depict a ramp assembly installation sequence in accordance with aspects of the present disclosure.
Figure 9B:
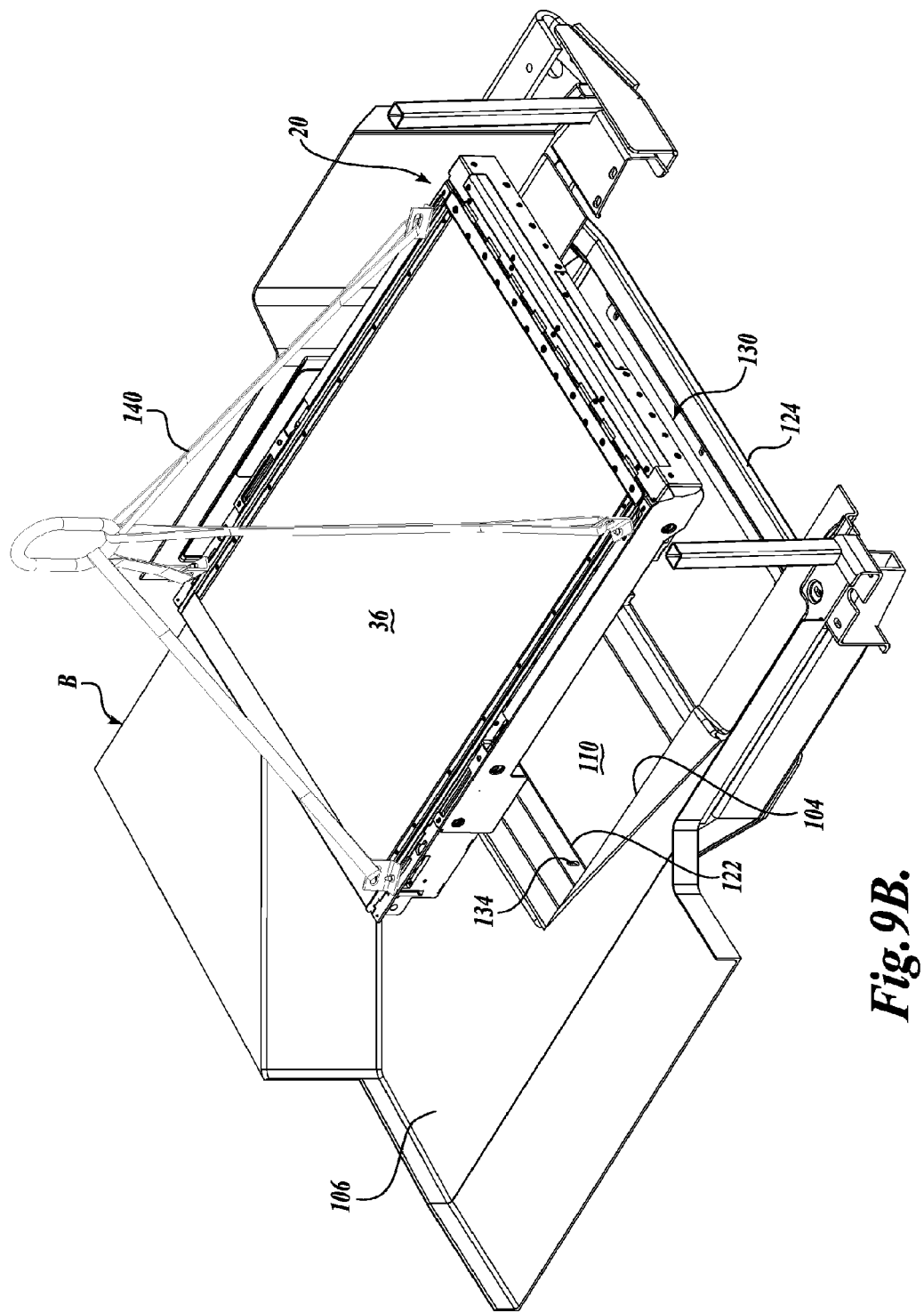
Figure 9C:
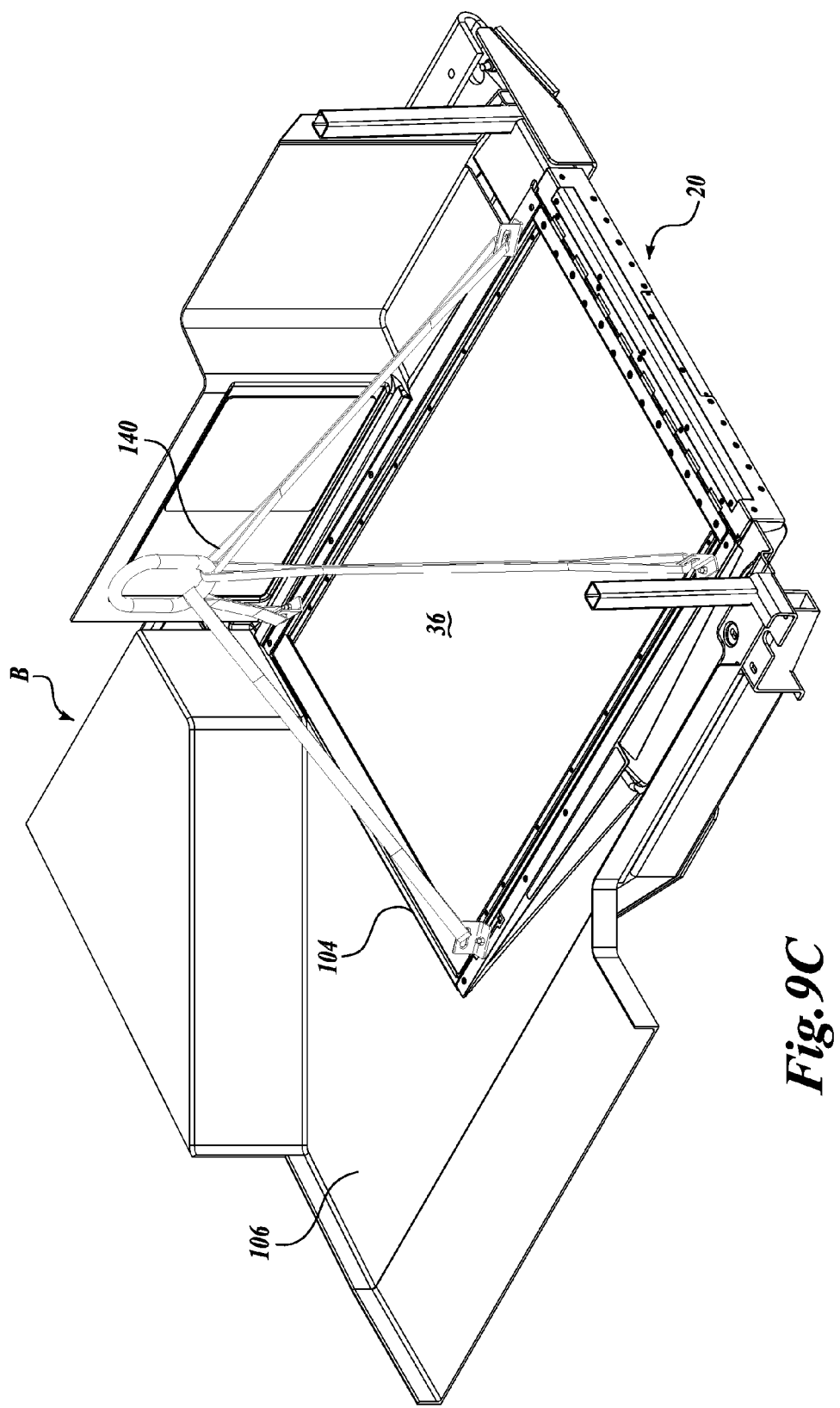

Referring now to FIGS. 9A-9C, one or more examples of methods for installing the ramp assembly 20 into a vehicle will now be described. FIG. 9A illustrates a portion of a vehicle, such as the bus B, having a rectangular cut-out 104 in its floor 106, thereby exposing a portion of the vehicle chassis and/or other components on which the ramp assembly will be supported. The floor cut-out 104 and the associated chassis/mounting components define a well 110 for receiving the ramp assembly 20. In the embodiment shown in FIG. 9A, the well 110 includes a first opening that opens upwardly into the vehicle interior (defined, for example, by the floor cut-out) and a second opening that opens outwardly toward the curb of an associated roadway (adjacent a door way of the vehicle).

The bottom of the well 110 is partially defined by either components of the chassis or structural members mounted thereto. In either case, there is provided a inboard ramp support member 122 disposed in parallel to an outboard ramp support member 124 and to the longitudinal centerline of the vehicle. In the embodiment shown, the outboard ramp support member 124 includes a plate-like shoulder 128 that extends horizontally (i.e., substantially parallel to the vehicle floor) inwardly thereof. The shoulder 128 includes a number of apertures shown as elongated slots 130 configured for receiving fasteners, such as bolts. The elongated slots 130 are positioned so as to be aligned with elongated slots 76 of the outboard cross member 72 when the ramp assembly 20 is supported in the well 110. In one embodiment, the elongated slots 130 are positioned such that their longitudinal axes are perpendicular to the outboard ramp support member 124, although other orientations are possible. As will be described in more detail below, the cooperation between the elongated slots 76 of the outboard cross member 72 the elongated slots 130 of the outboard ramp support member 124 provide positional adjustment of the ramp assembly 20 with respect to the vehicle well 110.

Similarly, a number of apertures shown as elongated slots 134 are provided in the vertical face of the inboard support cross member 122. The elongated slots 134 are configured for receiving fasteners, such as bolts, for mounting the mounting blocks thereto. The elongated slots 134, are positioned so as to be aligned with openings 80 (see FIG. 12) of the end wall 68 when the ramp assembly 20 is supported in the well 110. In one embodiment, the elongated slots 134 and the openings 80 are positioned such that when aligned, the elongated slots 76 and 130 described above are also substantially aligned. In the embodiment shown, the elongated slots 134 of the inboard ramp support member 122 are positioned such that their longitudinal axes extend vertically, perpendicular to the support cross member 122, although other orientations are possible. As will be described in more detail below, the elongated slots 134 provide positional adjustment of the mounting blocks, which in turn, provides for vertical positional adjustment of the bottom surface 36 of the outboard ramp 28 with respect to the vehicle floor.

Figure 8A:
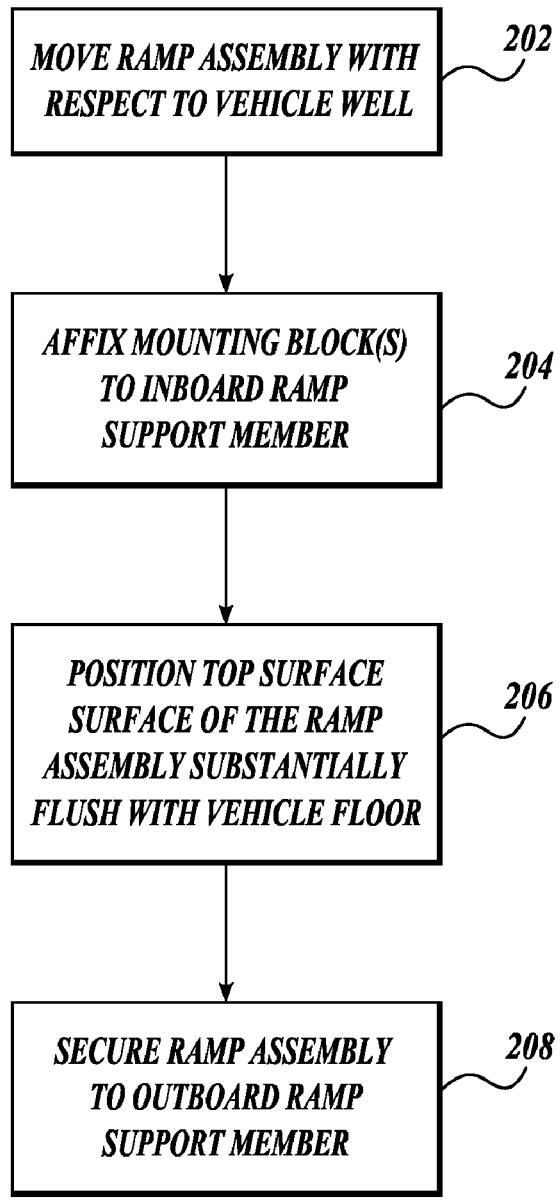
FIGS. 8A and 8B are flow diagrams depicting exemplary steps for installing the ramp assembly of FIG. 2.

One method of installing the ramp assembly 20 into an associated vehicle, such as bus B, in accordance with aspects of the present disclosure will now be described in detail with reference to the flowchart of FIG. 8A in conjunction with the remaining FIGURES. First, at step 202, the ramp assembly 20 is moved with respect to the vehicle well 110. In that regard, the ramp assembly 20 is generally aligned with and lowered into the vehicle well 110. In order to lower the ramp assembly 20 into the vehicle well 110, a lifting apparatus or the like (not shown) having a sling 140 may be employed, as best shown in FIG. 9B. The sling 140 is appropriately attached to the corners of the ramp assembly 20 (at side walls 62 and 64) via suitable hardware/fastener combinations. The ramp assembly 20 is then lowered into the vehicle well 110 via the lifting apparatus and sling 140 from the position shown in FIG. 9B until, for example, the end wall 68 is adjacent the inboard ramp support member 122 and, in one embodiment, the outboard cross member 72 of the frame 24 is supported by the shoulder 128 of the outboard ramp support member 124.

Next, at step 204, with the frame 24 of the ramp assembly 20 temporarily positioned within the vehicle well 110 with the assistance of, for example, the sling/lifting apparatus, a number of mounting blocks 82 are sequentially positioned against the vertical face of the inboard ramp support member 122 such that each mounting block throughbore 142 is aligned with a respective elongated slot 134 and the top surface 144 of the mounting block 82 contacts a respective engagement surface 84 (see FIGS. 12 and 13). In this position, the mounting blocks 82 are then affixed thereto via appropriate fasteners, such as bolts 86. Alternatively, in another embodiment, the mounting blocks 82 may be affixed at the bottom of the elongated slots 134. In this case, the inboard end of the ramp assembly is subsequently lowered so as to rest upon the mounting blocks 82.

In embodiments where the frame 24 of the ramp assembly 20 includes the shoulder 90 as shown in FIG. 13, the mounting blocks 82 can be easily positioned against the inboard ramp support member 122 from below the ramp assembly 20 and affixed thereto via bolts 86. In embodiments where the frame 24 of the ramp assembly 20 includes the openings 80 in the end wall 68, the bolts 86 are first inserted into the throughbores 142 of the mounting blocks 82, which are then together routed upwardly through the openings 92 of the bottom plate 94 from below the ramp assembly 20 (see FIG. 12). The bolts 86 and the mounting blocks 82 are then together passed laterally through the openings 80 so as to abut the inboard ramp support member 122. Once in place against the inboard ramp support member 122, a wrench or similar tool is then inserted into the openings 92 and the bolts are tightened against associated nuts 98. Washers, etc. may also be used as known in the art. It will be appreciated that in the step of affixing the mounting blocks 82, small positional adjustments (e.g., vertical, horizontal (e.g., inboard/outboard, lateral, etc.), rotational, etc.) of the frame 24 may be needed in order for the openings 80 of the end wall 68 of the frame 24 to align with the elongated slots 134 of the inboard ramp support member 122.

Once the ramp assembly 20 is temporarily supported within the well 110 via the mounting blocks 82, the sling 140, and/or the outboard ramp support member 124, course and/or fine adjustments to the positioning of the ramp assembly 20 with respect to the vehicle well 110 can be made at block 206 so that the bottom surface 36 (i.e., the top surface of the ramp assembly when in the stowed position) of the outboard ramp 28 is substantially flush (e.g., substantially co-planar) with the adjacent surfaces of the vehicle floor 106 as shown in FIG. 9C. In this regard, the vertical position of the inboard end of the ramp assembly 20 and/or the outboard end of the ramp assembly 20 may be adjusted, if desired. To begin, the vertical positioning of the ramp assembly 20 can be checked by either visual inspection or with appropriate measurement devices, such as levels, rulers, length gauges, etc. Then, if the bottom surface 36 is not substantially flush with the vehicle floor 106 (e.g., within a preselected tolerance, such as ⅛ inch), the vertical positioning of the ramp assembly 20 can be adjusted, if desired.

In one embodiment, vertical (i.e., height) adjustments can be made to the inboard end of the ramp assembly 20 either manually with the appropriate personnel or with the lifting apparatus and sling 140, if still attached to the ramp assembly. Once the inboard end of the ramp assembly 20 is in a desired vertical position, the mounting blocks 82 can then be sequentially moved vertically upwardly as needed, along the elongated slots 134 so that the mounting blocks 82 engage the engagement surfaces 84. The bolts 86 are then appropriately tightened against the corresponding nuts 98. It will be appreciated that in some embodiments the inboard end of the ramp assembly 20 may need to be lowered in order for the bottom surface 36 to be substantially flush with the vehicle floor 106. In this case, the bolts 86 are loosened and the mounting blocks 82 are moved downwardly within elongated slots 134 until the bottom surface 36 of the outboard ramp 28 is substantially flush with the vehicle floor. The bolts 86 are then appropriately tightened against the corresponding nuts 98.

Vertical (i.e., height) adjustments can also be made to the outboard end of the ramp assembly 20. For example, shims (not shown) or other similar structures known in the art can be placed between the outboard cross member 72 and the outboard ramp support member 124 as necessary to lift either the front side and/or the rear side of the ramp assembly 20. In order to position these shims, the ramp assembly 20 can be lifted either manually with the appropriate personal or with the lifting apparatus and sling 140, if still attached to the ramp assembly 20. The shims could also be placed during the initial lowering of the ramp assembly 20. Once there is sufficient gap between the outboard cross member 72 and outboard ramp support member 124, shims of the same or different thicknesses can be placed therebetween until the desired ramp assembly position is achieved.

Next, at block 208, the ramp assembly 20 is secured to the outboard ramp support member 124 via fasteners, such as bolts. It will be appreciated that small adjustments may be made (e.g., inboard/outboard, laterally) such that elongated slots 76 of the outboard cross member 72 are aligned with the elongated slots 130 of the outboard ramp support member 124 without resulting in a misalignment between the ramp assembly centerline and the vehicle well centerline. This can be achieved because the inboard end of the ramp assembly 20 is not secured to the mounting blocks 82 but only rests thereon (i.e., the vertical position of the inboard end of the ramp assembly is constrained but the horizontal position is unconstrained). As such, the ramp assembly 20 can move horizontally in either the front/rear or inboard/outboard direction with respect to the mounting blocks 82 in order for the ramp assembly 20 to achieve its desired position. It will be appreciated that other installation steps may also be preformed, such as installing close-outs, testing the deployment of the outboard ramp, centering the ramp assembly within the vehicle well, etc.

Figure 8B:
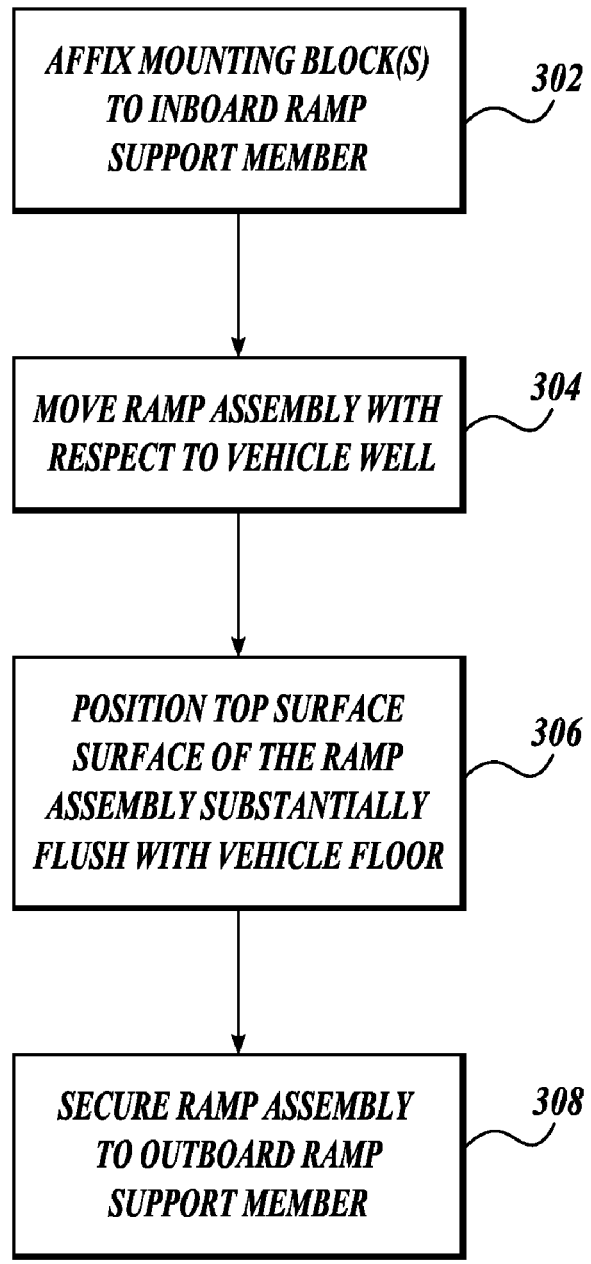
Figure 10A:
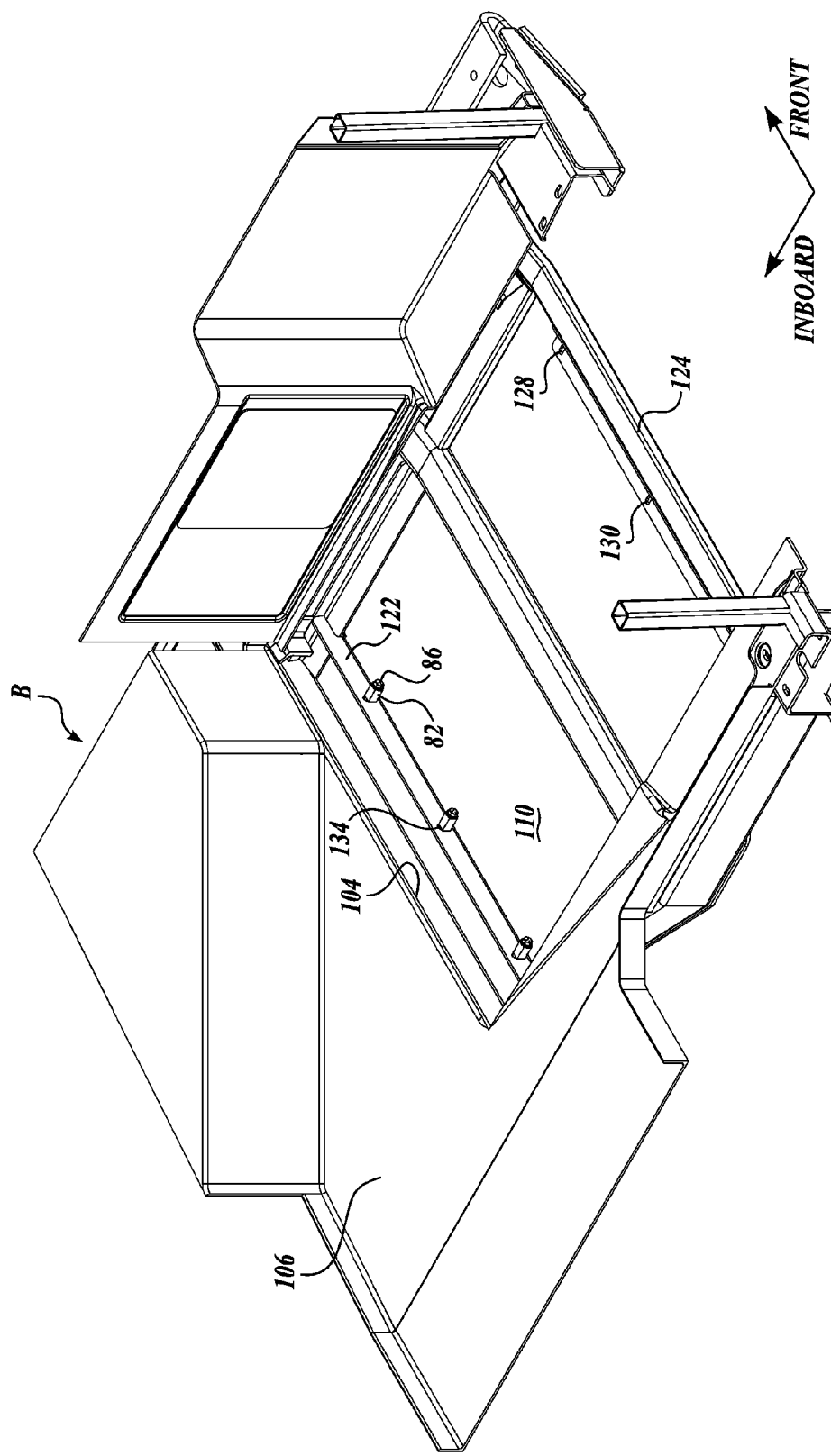
FIGS. 10A-10C depict another ramp assembly installation sequence in accordance with aspects of the present disclosure.

Another method of installing the ramp assembly 20 into an associated vehicle B in accordance with aspects of the present disclosure will now be described in detail with reference to the flowchart of FIG. 8B in conjunction with the remaining FIGURES. First, at step 302, a number of mounting blocks 82 are affixed to the inboard ramp support member 122 by routing bolts through the mounting block throughbores 142 and the corresponding elongated slots 134 of the inboard ramp support member 122 and securing corresponding nuts to the ends thereof as shown in FIG. 10A. It will be appreciated that washers, etc. may also be used as known in the art. It will be appreciated that the mounting blocks 82 may be affixed at any position along the elongated slots 134, although they are preferably affixed in general horizontal alignment.

Figure 10B:
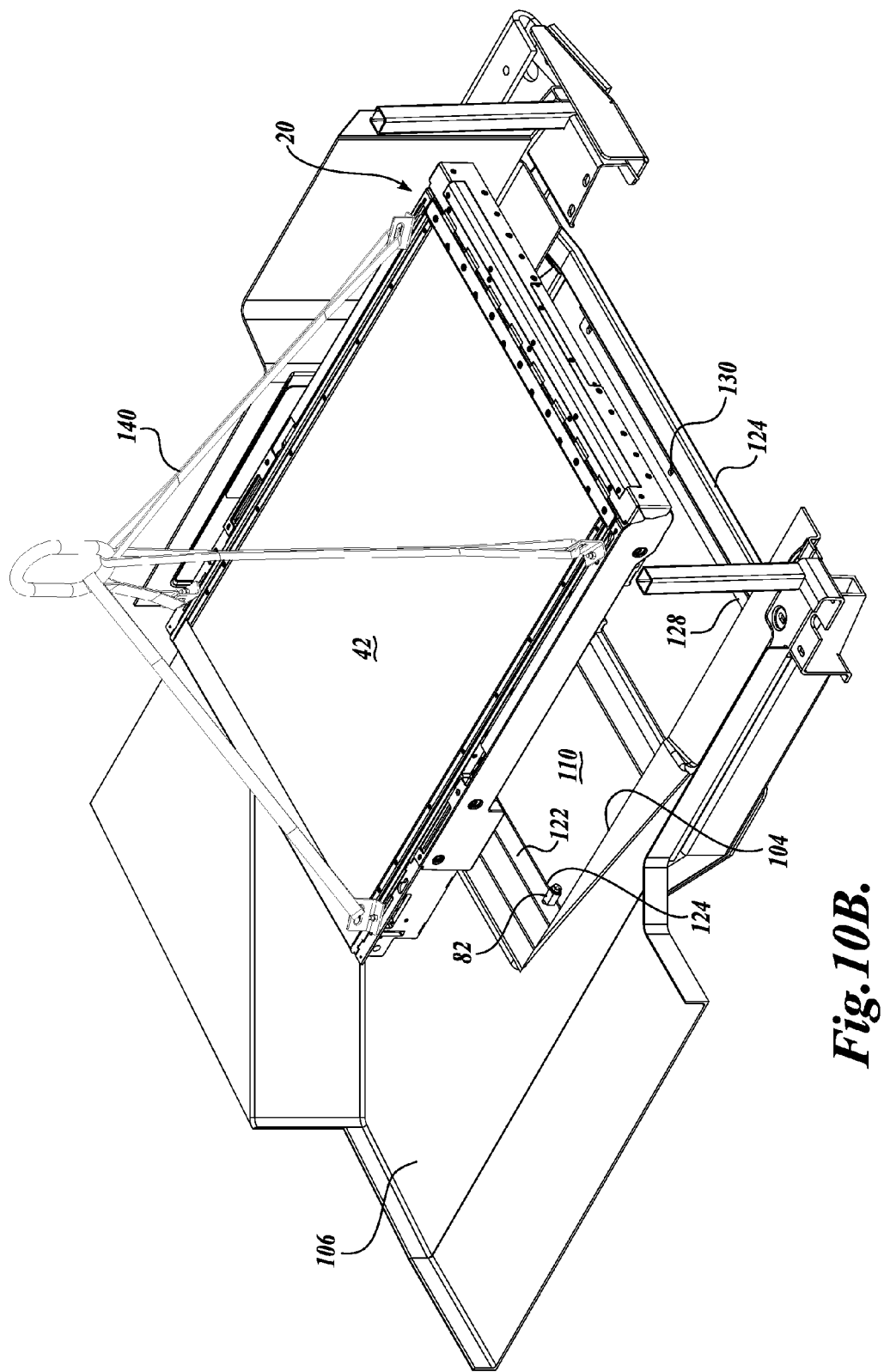

Next, at step 304, the ramp assembly is moved with respect to the vehicle well. In that regard, the ramp assembly 20 is lowered into the vehicle well 110. In order to lower the ramp assembly 20 into the vehicle well 110, a lifting apparatus or the like (not shown) having a sling 140 may be employed, as best shown in FIG. 10B. The sling 140 is appropriately attached to the corners of the ramp assembly 20 (at side walls 62 and 64) via suitable hardware/fastener combinations. The ramp assembly 20 is then lowered into the vehicle well 110 via the lifting apparatus and sling 140 from the position shown in FIG. 10B until the engagement surface(s) 84 of the end wall 68 rests upon the top surfaces 144 of the mounting blocks 82, and, in one embodiment, the outboard cross member 72 of the frame 24 is supported by the shoulder 128 of the outboard ramp support member 124.

In some embodiments, the position of the ramp assembly when lowered into the vehicle well may need to be altered. For example, depending of the configuration of the frame 24 (e.g. openings 80, etc.), it may be necessary to either tip the inboard portion of the ramp assembly downward in order for the mounting blocks to be inserted into the openings 80, or lower the ramp assembly to a position that is outwardly of the vehicle well, as shown in FIG. 11. From the position in FIG. 11, the ramp assembly can then be moved in the inboard direction to the position shown, for example, in FIG. 10C.

Figure 10C:
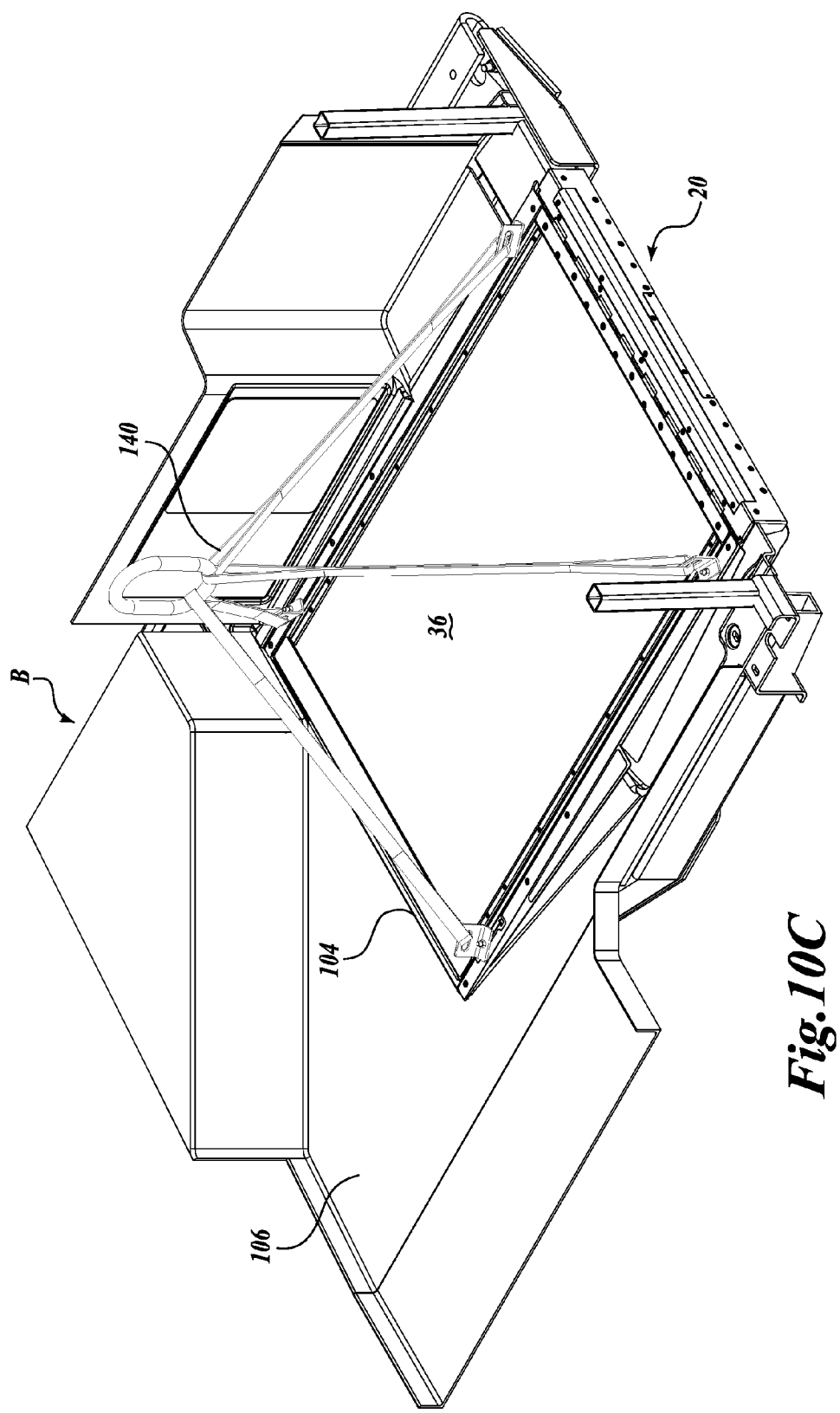
Figure 11:
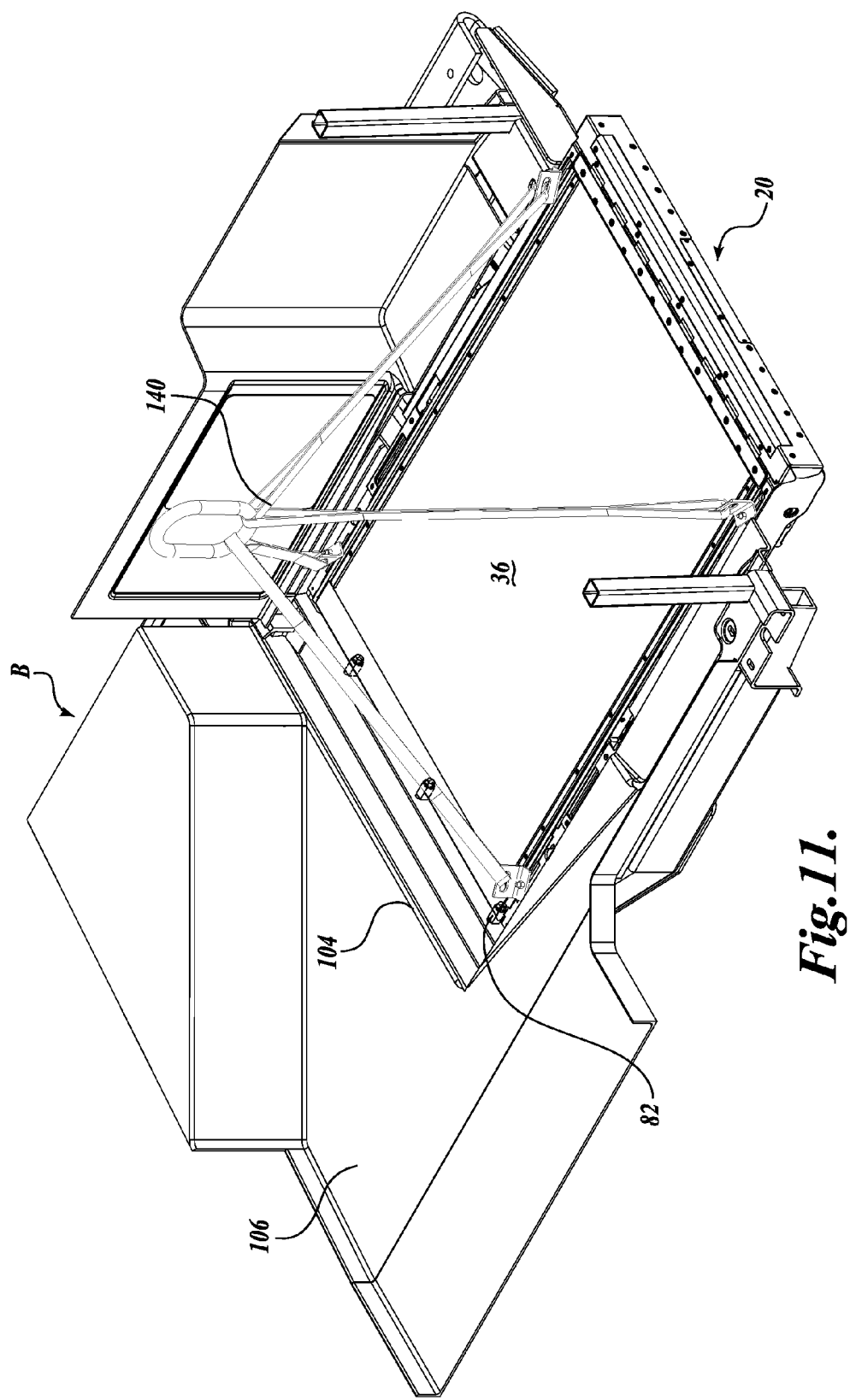
FIG. 11 depicts a step during another ramp assembly installation sequence in accordance with aspects of the present disclosure.

Once the ramp assembly is temporarily supported within the well 110 via the mounting blocks 82, the sling 140, and/or the outboard ramp support member 124, course and/or fine adjustments to the positioning of the ramp assembly 20 with respect to the vehicle well 110 can be made at block 306 so that the bottom surface 36 (i.e., the top surface of the ramp assembly when in the stowed position) of the outboard ramp 28 is substantially flush (e.g., substantially co-planar) with the adjacent surfaces of the vehicle floor 106, as shown in FIG. 10C. In this regard, the vertical position of the inboard end of the ramp assembly 20 and/or the outboard end of the ramp assembly 20 may be adjusted, if desired. To begin, the vertical positioning of the ramp assembly 20 can be checked by either visual inspection or with appropriate measurement devices, such as levels, rulers, length gauges, etc. Then, if the bottom surface 36 is not substantially flush with the vehicle floor 106 (e.g., within a preselected tolerance, such as ⅛ inch), the vertical positioning of the ramp assembly 20 can be adjusted, if desired.

In one embodiment, vertical (i.e., height) adjustments can be made to the inboard end of the ramp assembly 20 either manually with the appropriate personnel or with the lifting apparatus and sling 140, if still attached to the ramp assembly. Once the inboard end of the ramp assembly 20 is in a desired vertical position, the mounting blocks 82 can then be sequentially moved vertically upwardly as needed, along the elongated slots 134 so that the mounting blocks 82 engage the engagement surfaces 84. The bolts 86 are then appropriately tightened against the corresponding nuts 98. It will be appreciated that in some embodiments the inboard end of the ramp assembly 20 may need to be lowered in order for the bottom surface 36 to be substantially flush with the vehicle floor 106. In this case, the bolts 86 are loosened and the mounting blocks 82 are moved downwardly within elongated slots 134 until the bottom surface 36 of the outboard ramp 28 is substantially flush with the vehicle floor. The bolts 86 are then appropriately tightened against the corresponding nuts 98.

Vertical (i.e., height) adjustments can also be made to the outboard end of the ramp assembly 20. For example, shims (not shown) or other similar structures known in the art can be placed between the outboard cross member 72 and the outboard ramp support member 124 as necessary to lift either the front side and/or the rear side of the ramp assembly 20. In order to position these shims, the ramp assembly 20 can be lifted either manually with the appropriate personal or with the lifting apparatus and sling 140, if still attached to the ramp assembly 20. The shims could also be placed during the initial lowering of the ramp assembly 20. Once there is a sufficient gap between the outboard cross member 72 and the outboard ramp support member 124, shims of the same or different thicknesses can be placed therebetween until the desired ramp assembly position is achieved.

Next, at block 308, the ramp assembly 20 is secured to the outboard ramp support member 124 via fasteners, such as bolts. It will be appreciated that small adjustments may be made (e.g., inboard/outboard, laterally) such that elongated slots 76 of the outboard cross member 72 are aligned with the elongated slots 130 of the outboard ramp support member 124 without resulting in a misalignment between the ramp assembly centerline and the vehicle well centerline. This can be achieved because the inboard end of the ramp assembly 20 is not secured to the mounting blocks 82 but only rests thereon (i.e., the vertical position of the inboard end of the ramp assembly is constrained but the horizontal position is unconstrained). As such, the ramp assembly 20 can move horizontally in either the front/rear or inboard/outboard direction with respect to the mounting blocks 82 in order for the ramp assembly 20 to achieve its desired position. It will be appreciated that other installation steps may also be preformed, such as installing close-outs, testing the deployment of the outboard ramp, centering the ramp assembly within the vehicle well, etc.

It will be appreciated that any step described herein may be interchangeable with other steps, or combinations of steps, in order to achieve the same or substantially similar result. Moreover, two or more steps described herein may be combined to achieve the same or substantially similar result. For example, the steps of initially lowering the ramp assembly into the vehicle well and positioning the ramp assembly within the vehicle well so that the bottom surface of the outboard ramp (i.e., top surface of the ramp assembly when in the stowed position) is substantially flush with the vehicle floor can be combined into a single, integrated step.

The principles, representative embodiments, and modes of operation of the present disclosure have been described in the foregoing description and drawings contained herein. However, aspects of the present disclosure which are intended to be protected are not to be construed as limited to the particular embodiments disclosed. Further, the embodiments described herein are to be regarded as illustrative rather than restrictive. It will be appreciated that variations and changes may be made by others, and equivalents employed, without departing from the spirit of the present disclosure. Accordingly, it is expressly intended that all such variations, changes, and equivalents fall within the spirit and scope of the present disclosure, as claimed.

The embodiments of the invention in which an exclusive property or privilege is claimed are defined as follows:

1. A method of installing a ramp assembly into a vehicle, the vehicle having a floor, a vehicle well disposed in the floor, and inboard and outboard ramp support members, the method comprising:
   affixing one or more mounts to the inboard ramp support member; thereafter,
   moving the ramp assembly with respect to the vehicle well such that an outboard end of the ramp assembly is supported by the outboard ramp support member and an inboard end of the ramp assembly is supported by the one or more mounts so as to maintain a vertical position of the ramp assembly, the ramp assembly disposed in a stowed position with a top surface facing upwardly away from the vehicle floor;
   adjusting the position of the ramp assembly so that the top surface of the ramp assembly is substantially flush with the vehicle floor; and
   securing the outboard end of the ramp assembly to the outboard ramp support member.

2. The method of claim 1, wherein moving the ramp assembly includes
   coupling a lifting apparatus to the ramp assembly; and
   lowering the ramp assembly with respect to the vehicle well via the lifting apparatus.

3. The method of claim 1, wherein adjusting the position of the ramp assembly includes placing one or more shims between the outboard ramp support member and the ramp assembly until the top surface is substantially flush with the vehicle floor.

4. The method of claim 1, wherein adjusting the position of the ramp assembly includes moving vertically the inboard end of the ramp assembly until the top surface of the ramp assembly is substantially flush with the vehicle floor;
   moving the mounts into supporting relationship with the inboard end of the ramp assembly; and
   securing the mounts to the inboard ramp support member.

* * * * *

UNITED STATES PATENT AND TRADEMARK OFFICE
CERTIFICATE OF CORRECTION

PATENT NO. : 8,240,053 B1
APPLICATION NO. : 13/441755
DATED : August 14, 2012
INVENTOR(S) : David Johnson Page 1 of 1

It is certified that error appears in the above-identified patent and that said Letters Patent is hereby corrected as shown below:

In the Specification

| COLUMN | LINE | ERROR |
|---|---|---|
| 9 | 67 | "preformed," should read --performed,-- |

Signed and Sealed this
First Day of October, 2013

Teresa Stanek Rea
*Deputy Director of the United States Patent and Trademark Office*